O. H. BURDICK.
Harvester.
No. 52,927. Patented Feb. 27, 1866.
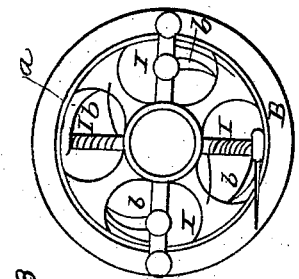
Fig. 3
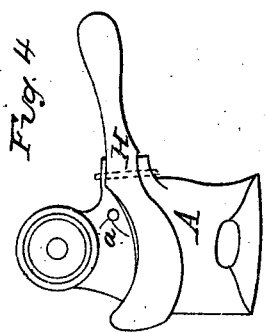
Fig. 4
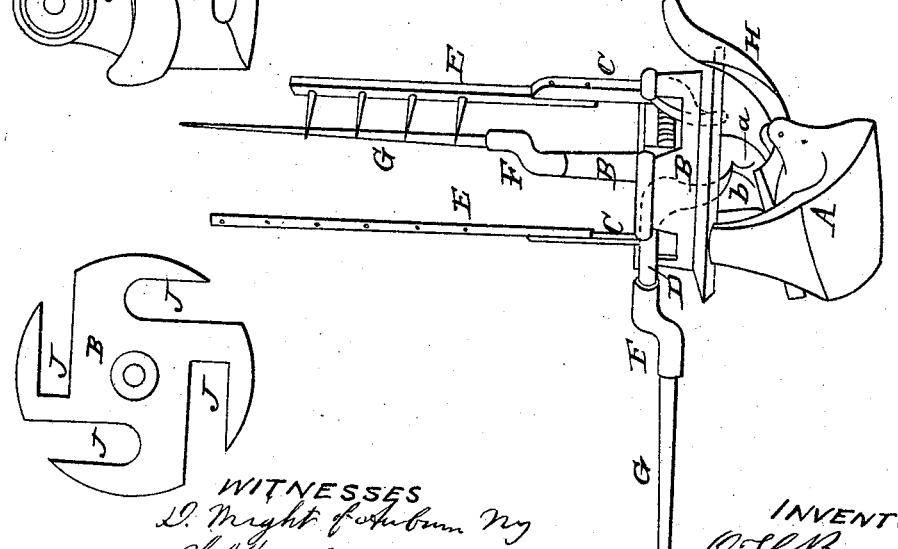
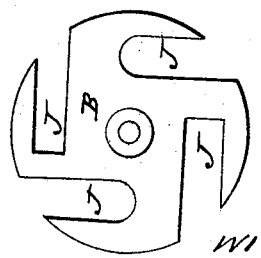
WITNESSES
INVENTOR

United States Patent Office.

ORREN H. BURDICK, OF AUBURN, NEW YORK, ASSIGNOR TO HIMSELF AND DAVID M. OSBORNE, OF SAME PLACE.

IMPROVEMENT IN HARVESTERS.

Specification forming part of Letters Patent No. 52,927, dated February 27, 1866.

*To all whom it may concern:*

Be it known that I, ORREN H. BURDICK, of the city of Auburn, in the county of Cayuga and State of New York, have invented certain new and useful Improvements in the Combined Rake and Reel of a Harvesting-Machine; and I do hereby declare that the following is a full, clear, and exact description thereof, reference being had to the accompanying drawings, making a part of this specification, in which—

Figure 1 represents a view of the combined rake and reel as seen from the front when in operation, one of the reel-beaters being in a horizontal and working position with its cam-projection just passing over the spur $a$. Fig. 2 represents the same view of said main frame, one of the rakes being in a horizontal and working position, with its cam-projection passing over the track end of the treadle H, the same having been raised so as to give to the rake its horizontal position. Fig. 3 represents a top view of the plate and shell B, showing the spiral springs for raising the rakes and reel-beaters. Fig. 4 is a top view of the main frame and treadle H. Fig. 5 represents the plate which covers the working parts of the machine.

The same letters denote the same parts in all the figures.

A represents the main frame of the combined rake and reel. It is of irregular shape, as shown in the drawings. It is cast of such shape so as to fit to the main frame or such other part of the harvester to which it is intended to attach it. Upon this main frame, and cast with and as a part of it, is a spur or projection, $a$, against which the cam-projection $b$ upon the lower end of the shank of each of the reel-beaters strikes as it revolves with the plate and shell B, causing the shank of said beater, as its cam is pressed backward and upward by this spur $a$ as it (the said reel-beater) rotates, to incline over and downward and to pass or fall into one of the recesses J which is left in the shell B to receive it, and at the same time the said beater, being fastened rigidly to its shank, falls so as to strike against and press the standing crop toward the cutters in the ordinary manner. When this cam has passed over this spur $a$ it is left free to move downward, and its reel-beater is thus left free to be easily raised to an upright position by the force exerted by the wire spring I, which is wound around its pivot or joint for that purpose. This main frame A also has cast upon it the center or hub, around which the plate and shell B revolve and upon which said plate and shell are supported.

B represents the plate and shell which supports the rakes and reel-beaters and their working parts, and upon the rim of which is cast the gear-wheel, into which a bevel-pinion meshes, whereby the motion is imparted which gives to the rakes and reel-beaters a circular and sweeping movement, this bevel-pinion, of course, being connected with the gearing of the harvester in any suitable manner.

C C represent the shanks into which the rake-heads are fastened. They are of cast-iron and are pivoted to the side of the plate and shell B. Each of said shanks has a hollow cylinder cast on one side near the lower end, above the cam part thereof, through which a screw-bolt is passed loosely, so that the shank may easily be caused to vibrate thereon as a center of motion when pressed downward or lifted or raised upward.

D D represent the shanks of the reel-beaters. They are also made of cast-iron, and are pivoted to the plate and shell B in the same manner as are the rake-shanks.

E E represent the rakes, the heads whereof are fitted into the rake-shanks C C, and are made rigid therewith by means of rivets or screw-bolts.

F F represent the adjustable cranks for the reel-beaters. They are made of cast-iron, and are fitted upon their shanks D D, so as to be turned thereon to any desired position, and are then held in place by a set-screw.

G G represent the reel-beaters, each of which is fastened into its crank F and moves with it.

H represents a pivoted lever, which is pivoted to the main frame by a bolt passing through it and through the sides of the jaws, which are cast upon said main frame to receive said lever. The inner portion of this lever serves as a way or track for the cam-projections of the rake-shanks to traverse or travel upon. The other or outer and broader end is used as a treadle upon which the operator presses with his foot, so as to raise said track or way end thereof when it is desired that the rake should operate. A latch is arranged so as to catch and hold said track end while the cam of the rake-shank is passing over and pressing upon it.

I I I I represent the wire springs, which are wound around the hollow cylinders which are cast upon the sides of the shanks of the rakes and reel-beater shanks, to lift or raise them to an upright position, and to retain them in that position when not operating.

J J J J represent the notches or openings left in the upper edge of the shell B, to allow the rakes and reel-shanks to be depressed therein when in operation.

Either of the rakes with its shank may be disconnected and withdrawn and a reel-beater with its shank and crank be substituted, if desired.

Having thus particularly described the several parts of the combined rake and reel as made by me, I will now describe its operation and the functions of its several and different component parts and their operation in the field.

The main frame thereof being attached to the main frame of the harvester, and the gear-wheel which is cast upon the rim of the plate B being connected by suitable gearing to the master-wheel of said harvester, when said master-wheel is moved motion is imparted through such intermediate gearing to the plate and shell B, which as it revolves carries with it all connected therewith or dependent thereon. As the cam-projection of any one of the reel-beaters in its regular rotation reaches the spur $a$ it slides upon it, and as the cam-projection rises the reel-shank is moved upon its pivot and the reel-beater connected therewith is thereby depressed until it reaches a horizontal position, and that depression and that position is continued while said cam-projection is passing over said spur $a$. When it has passed over said spur $a$, there being nothing further to obstruct its course, the force of the wire spring I acting as as a lifter to said reel-beater, as hereinbefore explained, causes the shank of said reel-beater to move back upon its pivot, and thereby lifts or raises said reel-beater to an upright position, and holds it in that position until its cam again reaches said spur $a$, when the same motions are again produced, and thus the motion of each reel-beater is governed as it is revolved. Should the operator perceive that the reel-beater, when in its horizontal or working position, presses either too high or too low upon the standing crop, he can very easily either lower or raise the same to the desired position by loosening the set-screw which fastens its crank to the shank thereof, and then by turning said crank either upward or downward as the case may require.

The spur $a$ is so located on the main frame A as to bring the reel-beater into its horizontal or working position when it is needed to press against the standing crop, and its length is so graduated as to allow the cam-projection upon the shank of the reel-beater to be disengaged just as the reel-beater reaches over the front edge of the platform of the harvester, thus allowing said reel-beater to be raised in time to prevent its interfering with the cut grain upon said platform.

It will be perceived from the above description of the reel-beaters, their connections, and mode of operation, that each operates entirely independent of the other, and that the breaking, disarranging, or disabling of one of them can have no influence whatever with the other; and it will be further observed that it is practicable and easy to have as many or as few reel-beaters rotating at the same time and operating in succession, each sweeping against the standing crop once during each revolution of the plate B, as may be found most useful in practice, the number being limited only by the capacity of said plate and shell to receive them.

The rakes receive their rotary motion in the same manner and through the same machinery and gearing by which like motion is imparted to the reel-beaters; but they are lowered and raised and receive their sweeping motion entirely independent of the reel-beaters and by means of entirely distinct contrivances and parts. Their cams rotate in a different track from that traversed by the cams of the reel-beaters, thus avoiding contact with said spur $a$. Their shanks are each furnished with a cam-projection at its extreme lower end. When it is intended to cause the rake to operate the driver or operator places his foot upon the treadle end of the lever H and by depressing that end causes said lever to move upon its pivot, and thus raises the other end, which is kept in its raised position by a latch so located and arranged as to catch and hold it in that position until the cam has passed over it, and as the cam, which forms the lower end of each rake-shank, in rotating reaches the raised part of this lever it presses against it and slides upon it, and as it rises, the rotary motion continuing, the rake-shank is moved downward upon its pivot, and the rake connected therewith is thereby depressed sufficiently so as to enable it to sweep the grain from the platform.

The lever H is so located as to depress the rake upon the platform at or very near the front edge thereof, so that the rake descends in front of the butts of the grain which has fallen upon the platform, and then, as the plate and shell B continues to revolve, the rake receives a sweeping motion and presses against the butts of the fallen grain and sweeps it from the platform at the stubble side thereof.

The length of that part of said lever upon which the rake-cam travels is so adjusted that by the time the rake reaches the edge of the stubble side of the platform its cam will have reached the end of the said lever, and will no longer be held up or obstructed thereby, and there being nothing further to prevent the force of the wire-spring I from acting as a lifter to the rake, said spring causes the rake-shank to move backward upon its pivot, and thus lifts and raises the rake to an upright position, and holds it in that position until it is desired to use it again, when the driver or operator again presses upon the treadle and the rake is again operated.

It will be perceived that so long as the lever H remains in its normal condition the rake will be held by force of the wire spring in an upright position, and will rotate without being depressed, the part of the lever over which the cam-projection passes being lower than the lowest part of said cam-projection, and hence the size of the gavels to be made depends upon the pleasure of the operator, as he may operate each rake once during each revolution of the plate and shell B, or he may permit said plate and shell B to make one or more revolutions without operating either of the rakes.

Having thus fully described the combined rake and reel and its several parts as made by me, and also its mode of operation and the functions of its several parts what I claim therein as new, and desire to secure by Letters Patent, is—

1. The combination of the spur $a$ with the cam of an independent reel-beater in a combined rake and reel, substantially as and for the purpose described.

2. In a combined rake and reel working independent of each other and on separate tracks, the combination of the track or way upon which the cam of the rake-shank travels with the cam of the shank of an independent rake, substantially as and for the purpose described.

3. An adjustable and controllable track or way for the cam of the rake-shank, made and operated by the treadle, substantially as herein set forth, and for the purpose described.

4. In a combined rake and reel, the employment of an entirely independent and separate track or way for the cam of the rake-shank from that traversed by the cams of the reel-beaters, substantially as and for the purpose described.

5. The employment, in a harvesting-machine having a combined reel and rake, both traversing at all times in different paths and both revolving around a vertical center, of the mechanism whereby the rakes and reel-beaters are made to traverse different paths over the platform, substantially as and for the purpose described.

6. The combination of the reel-beater with its adjustable crank, substantially as and for the purpose described.

O. H. BURDICK.

Witnesses:
D. WRIGHT,
CHAS. H. GARLOCK.